US012072493B2

(12) United States Patent
Osmanis et al.

(10) Patent No.: US 12,072,493 B2
(45) Date of Patent: Aug. 27, 2024

(54) NEAR-EYE DISPLAY APPARATUS AND METHOD OF DISPLAYING THREE-DIMENSIONAL IMAGES

(71) Applicant: Lightspace Technologies, SIA, Mārupes novads (LV)

(72) Inventors: Ilmārs Osmanis, Mārupes novads (LV); Kriss Osmanis, Babītes novads (LV); Roberts Zabels, Riga (LV); Mārtiņš Narels, Riga (LV); Uģis Gertners, Riga (LV); Gatis Valters, Līvāni (LV); Ainārs Ozols, Siguldas novads (LV)

(73) Assignee: Lightspace Technologies, SIA, Mārupes novads (LV)

( * ) Notice: Subject to any disclaimer, the term of this patent is extended or adjusted under 35 U.S.C. 154(b) by 704 days.

(21) Appl. No.: 17/109,441

(22) Filed: Dec. 2, 2020

(65) Prior Publication Data

US 2021/0096380 A1  Apr. 1, 2021

Related U.S. Application Data

(63) Continuation-in-part of application No. 15/928,643, filed on Mar. 22, 2018, now abandoned.

(51) Int. Cl.
*G02B 27/01* (2006.01)
*H04N 13/341* (2018.01)
*H04N 13/363* (2018.01)

(52) U.S. Cl.
CPC ....... *G02B 27/0172* (2013.01); *H04N 13/341* (2018.05); *H04N 13/363* (2018.05);
(Continued)

(58) Field of Classification Search
CPC .............. G02B 27/225; G02B 27/0172; G02B 27/2264; G02B 27/2278;
(Continued)

(56) References Cited

U.S. PATENT DOCUMENTS 5,583,674 A * 12/1996 Mosley .................. G09F 9/35
349/100
6,377,229 B1 * 4/2002 Sullivan ................ G06T 15/00
348/E13.058
(Continued)

FOREIGN PATENT DOCUMENTS

KR      100555807 B1    3/2006
KR      20170015375 A   2/2017

OTHER PUBLICATIONS

Korea Patent Office, Notification of Preliminary Rejection, Application No. 10-2020-7026128, mailed Dec. 27, 2023, 116 pages.
(Continued)

*Primary Examiner* — Ephrem Z Mebrahtu
(74) *Attorney, Agent, or Firm* — Ziegler IP Law Group, LLC.

(57) ABSTRACT

A near-eye display apparatus for displaying a three-dimensional image to a user. The apparatus includes an image projecting means to project pairs of images associated with different cross-sectional planes of the three-dimensional image; at least one optical display arrangement including a plurality of optical elements, wherein each of the plurality of optical elements is operable to be switched between a first optical state and a second optical state; a control arrangement that is operable to control the at least one optical display arrangement to separately switch each optical element from the first optical state to the second optical state, and the image projecting means to project a separate pair of images on each optical element in the second optical state; and at least one optical device that allows display of the three-dimensional image to each eye of the user.

20 Claims, 6 Drawing Sheets (52) U.S. Cl.
CPC ............... *G02B 2027/0174* (2013.01); *H04N 2213/005* (2013.01); *H04N 2213/008* (2013.01)

(58) Field of Classification Search
CPC .... G02B 2027/0127; G02B 2027/0134; G02B 2027/0136; G02B 2027/0138
See application file for complete search history.

(56) References Cited

U.S. PATENT DOCUMENTS

| | | | |
|---|---|---|---|
| 2002/0163482 A1* | 11/2002 | Sullivan | H04N 13/395 348/E13.058 |
| 2004/0061808 A1* | 4/2004 | Stephenson | G02F 1/1334 349/2 |
| 2004/0160550 A1* | 8/2004 | Stephenson | G02F 1/13718 349/86 |
| 2005/0068257 A1* | 3/2005 | Stephenson | G02F 1/134327 345/50 |
| 2015/0346495 A1* | 12/2015 | Welch | G02B 27/017 345/8 |
| 2016/0148586 A1* | 5/2016 | Amakawa | G09G 3/3629 345/97 |
| 2018/0003978 A1* | 1/2018 | Benitez | G02B 27/0172 |
| 2019/0264887 A1* | 8/2019 | Albou | G02F 1/133603 |

OTHER PUBLICATIONS

Borsali et al., Dynamic Light Scattering Studies of Cholesteric and Polymer-Stabilized Cholesteric Liquid Crystals, Physical Review E, Sep. 1998, R2717-R2720, vol. 58, No. 3.

* cited by examiner

NEAR-EYE DISPLAY APPARATUS AND METHOD OF DISPLAYING THREE-DIMENSIONAL IMAGES

TECHNICAL FIELD

The present disclosure relates generally to display systems; and more specifically, to near-eye display apparatuses for displaying three-dimensional images.

BACKGROUND

Generally, people have been presented with visual media in different forms for a very long time. For example, visual media in a form of videos (or images) has been presented to viewers for a variety of purposes, such as, for entertainment, science, defence, medical purposes and so forth. These days, both the presentation and consumption of visual media is taking increasingly complex forms, such as, videos are increasingly being presented in a three-dimensional format, to be able to provide more information and improved consumption quality of content to the viewers.

Traditionally, the three-dimensional videos are presented to the viewers on a two-dimensional plane, such as, a computer screen or a cinema screen, by using techniques like stereoscopy. Furthermore, a variety of software-based techniques may be employed to incorporate additional information into the three-dimensional videos. For example, techniques such as linear perspective, shading, occlusion, textures and so forth may be employed to enable presentation of depth cues within the three-dimensional videos to the viewers. However, such conventional presentation techniques are associated with a multitude of problems.

The conventional presentation techniques of three-dimensional videos only provide an illusion of presentation of depth to the viewers. Furthermore, such presentation techniques restrict the viewers from being able to perceive essential information that may be associated with an actual depth of an object presented in the three-dimensional videos. For example, information corresponding to different planes of a computer-generated object designed using a computer-aided design (CAD) software application cannot be truly perceived by the viewers. Furthermore, such conventional presentation techniques are associated with accommodation-vergence conflict, wherein the eyes of viewers struggle when trying to focus on different parts of an image located at different apparent distances within the presented three-dimensional videos. Such accommodation-vergence conflict leads to an uncomfortable experience for the viewers such as, due to fatigue of the eyes, headache and so forth, thereby making the consumption of three-dimensional videos unapproachable for the viewers. Moreover, such conventional presentation techniques usually fail to satisfactorily present the three-dimensional images at reduced distances from the viewers' eye, such as, in near-eye displays.

Therefore, in light of the foregoing discussion, there exists a need to overcome the aforementioned drawbacks associated with conventional techniques of presentation of three-dimensional visual media to viewers.

SUMMARY

The present disclosure seeks to provide a near-eye display apparatus for displaying a three-dimensional images to eyes of a user. The present disclosure also seeks to provide a method of displaying a three-dimensional images using a near-eye display apparatus. The present disclosure seeks to provide a solution to the existing problems associated with conventional techniques of presentation of three-dimensional visual media to viewers. An aim of the present disclosure is to provide a solution that overcomes at least partially the problems encountered in prior art, and provides a near-eye display apparatus and a method of displaying a three-dimensional images to viewers. In one aspect, an embodiment of the present disclosure provides a near-eye display apparatus for displaying a three-dimensional image to eyes of a user, wherein the apparatus comprises:

an image projecting means to project a first set of images and a second set of images corresponding to the three-dimensional image, wherein corresponding images of the first set of images and the second set of images form pairs of images associated with different cross-sectional planes of the three-dimensional image;

at least one optical display arrangement comprising a plurality of optical elements, wherein each of the plurality of optical elements is operable to be switched between a first optical state and a second optical state, the active substance in each of the plurality of optical elements comprise a polymer free cholesteric liquid crystal;

a control arrangement operatively coupled to each of the image projecting means and the at least one optical display arrangement, wherein the control arrangement is operable to control:
the at least one optical display arrangement to separately switch each optical element of the plurality of optical elements from the first optical state to the second optical state; and
the image projecting means to project a separate pair of images on each optical element in the second optical state, for displaying the three-dimensional image to each eye of the user; and at least one optical device arranged between the at least one optical display arrangement and the eyes of the user, wherein the at least one optical device allows display of the three-dimensional image to each eye of the user.

In another aspect, an embodiment of the present disclosure provides a method of displaying a three-dimensional image using a near-eye display apparatus, the near-eye display apparatus comprising a plurality of optical elements, wherein each of the plurality of optical elements is operable to be switched between a first optical state and a second optical state, the active substance in each of the plurality of optical elements comprise a polymer free cholesteric liquid crystal, wherein the method comprises:

projecting a first set of images and a second set of images corresponding to the three-dimensional image, wherein corresponding images of the first set of images and the second set of images form pairs of images associated with different cross-sectional planes of the three-dimensional image;

switching, separately, each optical element of the plurality of optical elements from the first optical state to the second optical state; and displaying the three-dimensional image to each eye of a user by providing a separate pair of images on each optical element in the second optical state.

Embodiments of the present disclosure substantially eliminate or at least partially address the aforementioned problems in the prior art, and enables effective presentation of three-dimensional visual media to viewers.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a near-eye display apparatus for displaying a three-dimensional image to eyes of a user, wherein the apparatus comprises:
  an image projecting means to project a first set of images and a second set of images corresponding to the three-dimensional image, wherein corresponding images of the first set of images and the second set of images form pairs of images associated with different cross-sectional planes of the three-dimensional image;
  at least one optical display arrangement comprising a plurality of optical elements, wherein each of the plurality of optical elements is operable to be switched between a first optical state and a second optical state, the active substance in each of the plurality of optical elements comprise a polymer free cholesteric liquid crystal;
  a control arrangement operatively coupled to each of the image projecting means and the at least one optical display arrangement, wherein the control arrangement is operable to control:
    the at least one optical display arrangement to separately switch each optical element of the plurality of optical elements from the first optical state to the second optical state; and
    the image projecting means to project a separate pair of images on each optical element in the second optical state, for displaying the three-dimensional image to each eye of the user; and
  at least one optical device arranged between the at least one optical display arrangement and the eyes of the user, wherein the at least one optical device allows display of the three-dimensional image to each eye of the user.

In another aspect, an embodiment of the present disclosure provides a method of displaying a three-dimensional image using a near-eye display apparatus, the near-eye display apparatus comprising a plurality of optical elements, wherein each of the plurality of optical elements is operable to be switched between a first optical state and a second optical state, the active substance in each of the plurality of optical elements comprise a polymer free cholesteric liquid crystal, wherein the method comprises:
  projecting a first set of images and a second set of images corresponding to the three-dimensional image, wherein corresponding images of the first set of images and the second set of images form pairs of images associated with different cross-sectional planes of the three-dimensional image;
  switching, separately, each optical element of the plurality of optical elements from the first optical state to the second optical state; and
  displaying the three-dimensional image to each eye of a user by providing a separate pair of images on each optical element in the second optical state.

The present disclosure provides the near-eye display apparatus comprising the image projecting means, the at least one optical display arrangement, the control arrangement and the at least one optical device. The at least one optical display arrangement comprises a plurality of optical elements, wherein each of the plurality of optical elements is operable to be switched between the first optical state and the second optical state. Furthermore, separate pairs of images corresponding to the three-dimensional image are projected onto an optical element of the plurality of optical elements in the second optical state. Subsequently, the projected three-dimensional image is displayed to each eye of the user. Such a display of the three-dimensional image using the plurality of optical elements enables improved depth perception associated with the three-dimensional image for the user. Furthermore, the three-dimensional image is presented at different physical depths corresponding to the plurality of optical elements arranged in a three-dimensional space, thereby, enabling eyes of the user to conveniently focus at different physical depths associated with the three-dimensional image. Thus, the near-eye display apparatus and the method substantially overcome problems of accommodation-vergence conflict associated with conventional techniques for presentation of three-dimensional visual media. Consequently, such a reduction of problems of accommodation-vergence conflict ensures a comfortable viewing experience for the user. Moreover, the near-eye display apparatus can be used to present the three-dimensional visual media near the eyes of the user, such as, by implementation thereof in virtual-reality and augmented-reality headsets.

Throughout the present disclosure the term "near-eye display apparatus" as used herein, relates to a device that can be positioned near eyes of a user thereof, such as, by allowing the user to wear (by mounting) the near-eye display apparatus on a head thereof. Furthermore, such a near-eye display apparatus enables presentation of images and/or videos to eyes of the user. Examples of such near-eye display apparatuses include, but are not limited to, head mounted displays (HMDs), head-up displays (HUDs), virtual-reality display devices, augmented-reality display devices, and so forth. In one example, the near-eye display apparatus is capable of presenting images or videos associated with three-dimensional (or 3D) objects to the user. Such images or videos can correspond to computer-generated (or virtual) objects, real objects and so forth. The three-dimensional images can refer to three-dimensional representation of a real world object or computer rendered object such as three-dimensional model of an object. The three-dimensional image can refer to image of a landscape or space having plurality of different objects In one example, a plurality of images (or videos) displayed on the near-eye display apparatus correspond to a same three-dimensional image. Such a plurality of images (or videos) can be portions (or slices) that represent different cross-sectional planes of the three-dimensional image. For example, the three-dimensional image may be a computer-generated spherical object (such as a ball). In such an example, the plurality of images comprises 11 images and each of the plurality of images can correspond to different cross-sectional planes of the spherical object. Furthermore, a first and a last of the plurality of images can correspond to a front and rear circular planes respectively (having a least diameter) of the spherical object whereas a sixth image can correspond to a central circular plane (having a maximum diameter) of the spherical object.

The apparatus comprises an image projecting means to project a first set of images and a second set of images corresponding to the three-dimensional image, wherein corresponding images of the first set of images and the second set of images form pairs of images associated with different cross-sectional planes of the three-dimensional image. Throughout the present disclosure, the term "image projecting means" as used herein, relates to a device capable of projecting images and/or videos. Such an image projecting means can be implemented as a projector that is capable of projecting the images and/or videos onto a surface (such as a screen).

The first set of images and the second set of images are the portions (or slices) that correspond to different cross-sectional planes of the three-dimensional image. Furthermore, corresponding images of the first set of images and the second set of images form pairs of images associated with different cross-sectional planes of the three-dimensional image. In an example, the three-dimensional image corresponds to a rectangular box, wherein the rectangular box is associated with 15 images, each image corresponding to a different cross-sectional plane thereof. In such an example, a first image of each of the first set and the second set of images correspond to a front plane of the rectangular box (such first image of the first set and the second set can be a same image) and a fifteenth image of each of the first set and the second set of images correspond to a rear plane of the rectangular box. In such an example, it will be appreciated that corresponding images of each of the first set and the second set correspond to a same cross-sectional plane of the three-dimensional image and thus, such corresponding images form pairs of images. In the aforementioned example, the first image of each of the first set and the second set of images form a first pair of images, a second image of each of the first set and the second set of images form a second pair of images and so forth. Alternatively, corresponding images of the first set and the second set of images can be different images, for example, images representing slightly-shifted perspectives of a specific cross-sectional plane of the three-dimensional image. Moreover, the first set of images and the second set of images may correspond to images (or frames of a video) displayed for a left eye and a right eye respectively of the user of the near-eye display apparatus. For example, the first set of images can be displayed for the left eye of the user and the second set of images can be displayed for the right eye of the user.

The image projecting means can be capable of projecting a high number of such images (or frames of the video) per second. Such a number of projected images per second has been referred to as "volumetric refresh rate" (or "volumes per second", abbreviated as "Vps") of the image projecting means throughout the present disclosure. The volumetric refresh rate of the image projecting means can correspond to a number of times each image of the first set and/or the second set of images (or each pair of images) is projected by the image projecting means per second. For example, when the first set and the second set of images comprise 10 images (or for example 4-8) and the image projecting means has the volumetric refresh rate of 50 Vps, the image projecting means is capable of projecting 10×50 images (or 500 images) per second. In an embodiment, the image projecting means has the volumetric refresh rate of more than 50 Vps. Optionally, the image projecting means has the volumetric refresh rate of at least 100 Vps. Such a volumetric refresh rate may be achieved by employing DLP® technology developed by Texas Instruments Inc. of Dallas, Texas, United States. Also fast ferroelectric LCOS might be used—for example Forth Dimension LCOS®.

In one embodiment, the image projecting means comprises a single projector that is capable of simultaneously projecting both the first set of images and the second set of images. For example, the image projecting means can project the first set and the second set of images such that first set and the second set of images are separated by a predefined physical gap. In another embodiment, the image projecting means can comprise two separate projectors, wherein each of the two projectors is capable of individually projecting the first set of images and the second set of images respectively. In yet another embodiment, the image projecting means comprises a single image projector that is capable of projecting a single set of images corresponding to the three-dimensional image, for both eyes of the user.

The apparatus comprises at least one optical display arrangement comprising a plurality of optical elements. The term "optical display arrangement" as used throughout the present disclosure, relates to an optical display device arranged in the apparatus for displaying the projected images corresponding to the three-dimensional image. Furthermore, the optical display arrangement comprises the plurality of optical elements for displaying the images. The term "optical element" as used herein, relates to a screen that is capable of displaying the projected images thereon. In an example, the optical element may be an optical diffuser. In another example, the optical display arrangement may be implemented as a volumetric display arrangement comprising a plurality of optical diffusers.

Furthermore, each of the plurality of optical elements is operable to be switched between a first optical state and a second optical state. Such an optical state of each of the plurality of optical elements can be changed by modifying one or more properties of the optical element. In one embodiment, the plurality of optical elements comprises an active substance. For example, the active substance of each of the plurality of optical elements can comprise cholesteric liquid crystal based materials, liquid crystals, such as Polymer Free Liquid Crystals (or PFLCs) or for example Polymer dispersed and polymer stabilized liquid crystals. Furthermore, the PFLCs may be a mixture of low-viscosity liquid crystals and a chiral dopant. In such an example, an alignment of molecules of the liquid crystals of the active substance can be modified to switch each of the optical elements from the first optical state to the second optical state (and from the second optical state to the first optical state). Moreover, such an alignment of the molecules can be modified by applying a voltage across the optical element. Thus, the optical element can be electrically switched between the two optical states.

In one embodiment, the first optical state is an optically transparent state and the second optical state is an optically opaque state. For example, in the optically transparent state, the optical element allows light associated with the images projected by the image projecting means to substantially pass through the optical element. Consequently, the images are not displayed on the optical element in the optically transparent state thereof. Furthermore, in the optically opaque state, the optical element obstructs the light associated with the images projected by the image projecting means and consequently, the images can be displayed on the optical element.

In one embodiment, the optical elements comprise polymer free cholesteric liquid crystals, which ensure fast transition between the first optical state and the second optical state. Cholesteric liquid crystals in a homeotropically aligned liquid crystal cell upon electric field are in the homeotropic state which is characterized by ordered alignment of liquid crystal molecules—and corresponds to the first optical state. Whereas, in the electric field-off state, the homeotropic state of cholesteric liquid crystals collapse and the liquid crystal transitions into a focal-conic state (texture), which is characterized by multiple domains facilitating effective scattering of incident light of visible spectrum. The focal-conic state corresponds to the second optical state.

Polymer free cholesteric liquid crystals provide additional beneficial effects, when used in optical elements. Namely, the polymer free cholesteric liquid crystals enable fast transition between optical states of the optical elements, as no additional stabilizing polymer networks are interacting with the liquid crystal molecules. In an embodiment, a time period of switching between the first optical state and the second optical state is less than or equal to 600 microseconds. In the polymer free cholesteric liquid crystals, the transitions occur on the order of hundreds of microseconds, normally in the range of 200-600 microseconds. Therefore, the transition period is much faster and the response time of the optical elements is decreased. Therefore, in one embodiment of the invention of optical elements comprising polymer free cholesteric liquid crystals, the transitions from the first optical state to the second optical state and from the second optical state to the first optical state occur in less period of time than 600 microseconds. The transitions from the first optical state to the second optical state occur in the range from 200 up to 600 microseconds. The transitions between the first optical state and the second optical state can occur in time period from 200, 300, 400, 500 microseconds up to 300, 400, 500, 600 microseconds. Therefore, the optical elements comprising polymer free cholesteric liquid crystals enable more effective and faster transition between the first optical state and the second optical state, which causes less haze in the first optical state and enables eyes of the user to focus more conveniently at different physical depths associated with the three-dimensional image. Consequently, fast switching between the optical states results in a reduction of problems of accommodation-vergence conflict and provides a better quality of displaying three-dimensional images to the eyes of a user.

In an embodiment, the active substance of the optical element is enclosed between supporting substrates. For example, the supporting substrates can be implemented using thin sheets of a transparent dielectric material, such as soda-lime glass. Furthermore, the supporting substrates can be separated using optically transparent spacers, such as spheres made of a material having a substantially similar refractive index (such as, to within 95-100%) to the active substance. For example, the optically transparent spacers can be fabricated using glass, a hard-plastic material (such as polycarbonate or poly(methyl methacrylate)). Moreover, a surface of each of the supporting substrates facing the active substance can comprise a coating of a transparent electrically-conductive material (or transparent electrodes), including, but not limited to, indium tin oxide (ITO), metal-doped zinc oxide (such as Mg-doped, Al-doped or Cr-doped ZnO), silver nanowire meshes, grapheme layers, conductive polymer films and so forth. Optionally, a surface of each of the supporting substrates facing away from the active substance can comprise a coating of an anti-reflective material, including, but not limited to, laminated structures of $SiO_2$—$TiO_2$, $SiO_2$—$Nb_2O_5$, and so forth. Such an arrangement of the active substance, the transparent electrically-conductive material, the optically transparent spacers and so forth can be sealed between the supporting substrates by applying a polymer seal along a perimeter of the supporting substrates.

In one embodiment, the plurality of optical elements forms a monolithic structure. For example, the plurality of optical elements may be arranged such that the optical display arrangement forms a single block of optical elements. In such an example, there may or may not be a gap between each of the plurality of optical elements forming the optical display arrangement. Furthermore, the plurality of optical elements can be laminated together, such as, by employing an optical cement, to form the optical display arrangement having the monolithic structure. In another embodiment, each of the plurality of optical elements is arranged either equidistant from each other, or at different distances from each other. For example, each of the plurality of optical elements is arranged at a predetermined distance from each other. According to one embodiment, the distance between each of the plurality of optical elements is equal to 0.2 millimetres, or more than 0.2 millimetres (such as 1 millimetre). Alternatively, each of the plurality of optical elements is arranged at different distances (such as, at an increasing or decreasing distance) from each other. For example, the distances between successive optical elements are based on a logarithmic or an exponential function. For example, the distance between a first optical element and a second optical element of an optical display arrangement is 0.2 millimetres, a distance between the second optical element and a third optical element is 0.4 millimetres, and so forth.

The apparatus comprises a control arrangement operatively coupled to each of the image projecting means and the at least one optical display arrangement. The control arrangement can be operatively coupled to the image projecting means and the at least one optical display arrangement using wired or wireless connection. Furthermore, the control arrangement is operable to control operation of the image projecting means and the at least one optical display arrangement. The control arrangement is operable to control the at least one optical display arrangement to separately switch each optical element of the plurality of optical elements from the first optical state to the second optical state. For example, the control arrangement is operable to sequentially switch each of the plurality of optical elements from the first optical state (such as the optically transparent state) to the second optical state (such as the optically opaque state) after a predefined duration of time. In such an example, the control arrangement can switch a first optical element of the plurality of optical elements from the first optical state to the second optical state. Subsequently, the control arrangement can switch the first optical element from the second optical state back to the first optical state and simultaneously, the control arrangement can switch a second optical element of the plurality of optical elements from the first optical state to the second optical state.

In one embodiment, the plurality of optical elements is switched between the first optical state and the second optical state in a sequential manner, or an interlaced manner. For example, as discussed hereinabove, the control arrangement is operable to switch the first optical element from the first optical state to the second optical state. Subsequently, when the first optical element is switched back to the first optical state, the control arrangement is operable to switch the second optical element to the second optical state. Similarly, all the optical elements are sequentially switched to the second optical state when the optical element located prior thereto is switched back to the first optical state and wherein all other optical elements of the plurality of optical elements are maintained in the first optical state. Alternatively, the plurality of optical elements is switched between the first optical state and the second optical state in the interlaced manner. For example, optical elements located at even positions (such as, a second position, a fourth position, a sixth position and so forth) are sequentially switched from the first optical state to the second optical state and subsequently, optical elements located at odd positions (such as, a first position, a third position, a fifth position and so forth) are sequentially switched from the first optical state to the second optical state.

In one embodiment, the apparatus further comprises a voltage source operatively coupled to each of the at least one optical display arrangement and the control arrangement, wherein the control arrangement is further operable to control the voltage source to apply a control voltage for a first period of time to the at least one optical display arrangement to switch each optical element from the second optical state to the first optical state, or remove the applied control voltage to switch the optical element from the first optical state to the second optical state. The voltage source can be operatively coupled to the control arrangement or optionally, the voltage source can be incorporated with the control arrangement into a control module. Furthermore, the voltage source can be operatively coupled to the optical display arrangement, such as, using solder or copper-based bus bars mounted on each of the plurality of optical elements. In an example, the control arrangement is operable to provide an instruction to the voltage source to apply a predefined control voltage to an optical element of the plurality of optical elements. In response to the applied control voltage, the optical element switches from the second optical state to the first optical state. Subsequently, after the first period of time, the control arrangement is operable to provide an instruction to the voltage source to remove the applied control voltage. In response to such removal of the applied control voltage, the optical element switches back from the first optical state to the second optical state.

In one embodiment, the control voltage comprises a first voltage and a second voltage, wherein an absolute value of the second voltage is from 20% up to 65% higher than an absolute value of the first voltage and wherein the second voltage is applied before the first voltage. The first voltage and the second voltage are applied during the first period of time, where the first period of time is a total time of applying the control voltage. The second voltage is applied immediately before applying the first voltage during the first period of time. The second voltage, having an absolute value from 20% up to 65% higher than the absolute value of the first voltage, is applied before applying the first voltage to the at least one optical display arrangement to switch each optical element from the first optical state to the second optical state or from the second optical state to the first optical state. The absolute value of the second voltage can be from 20%, 25%, 30%, 35%, 40%, 45%, 50% up to 35%, 40%, 45%, 50%, 55%, 60%, 65% higher than the first voltage. For example, if the first voltage is 150V, the second voltage can be in the range from 180V, 190V, 200V, 210V, 220V up to 220V, 230V, 240V, 250V, 260V. Applying the second voltage having the absolute value from 20% up to 65% higher than the absolute value of the first voltage immediately before applying the first voltage reduces response time of switching optical states between the first optical state and the second optical state. The second voltage and the first voltage are applied during the first period of time, wherein a period for applying the second voltage is shorter than the period for applying the first voltage. When duration of the period for applying the second voltage is too long, the optical element may be damaged by the second voltage. Therefore, it is important to apply the second voltage only for the period of time being shorter than the period of applying the first voltage. Duration of the period for applying the second voltage can be from 1% up to 10% of the first period of time. Duration of the period for applying the second voltage can be from 1%, 2%, 3%, 4%, 5%, 6% up to 5%, 6%, 7%, 8%, 9%, 10% of the first period of time. After applying the second voltage, the second voltage is decayed by exponential relaxation to the first voltage during a decay period, which lasts in the order of milliseconds. For example, the period for applying the second voltage can be in the range from 5, 10, 20, 30, 40, 50, 60, 70, 80, 80, 90, 100, 110 milliseconds up to 80, 90, 100, 110, 120, 130, 140, 150 160, 170, 180, 190, 200 milliseconds and the decay period can be in the range from 0.5, 0.8, 1, 1.2, 1.5, 2, 3, 4 microseconds up to 3, 4, 5, 6, 7, 8, 9, 10 microseconds. Based on the experiments, applying the second voltage having the absolute value from 20% up to 65% higher than the absolute value of the first voltage improves the response time of switching between the first optical state and the second optical state.

In one embodiment, the control arrangement is further operable to control the voltage source to select the absolute value of the second voltage and duration of a period for applying the second voltage based on a surrounding environment temperature. The control voltage comprises the first voltage and the second voltage and the control voltage is applied for the first period of time. The duration of the period for applying the second voltage is comprised in the first period of time. By the term "surrounding environment" it is meant an environment surrounding the optical elements, which may be a room or outside environment. The absolute value of the second voltage can be chosen based on the surrounding environment temperature.

This means, that when the surrounding environment temperature is lower, the higher absolute value of the second voltage compared to the absolute value of the first voltage is selected and applied. For example, when the surrounding environment temperature is in the range of 0° C. to 10° C. degrees, the higher absolute value of the second voltage is necessary to obtain fast transition between the first optical state and the second optical state of the optical elements. This means, that the second voltage applied at surrounding environment temperature being in the range of 0° C. to 10° C. degrees has the absolute value at least from 20% up to 65% higher compared to the absolute value of the first voltage. When the surrounding environment temperature is less than 0° C., the absolute value of the second voltage is at least from 50%, 55%, 60% up to 55%, 60%, 65%, higher compared to the absolute value of the first voltage. Alternatively, at lower temperatures, duration of the period for applying the second voltage may be longer. For example, at temperature range from 0° C. up to 10° C. degrees, duration of the period for applying the second voltage is at least from 6%, 7%, 8%, 9% up to 7%, 8%, 9%, 10% of the first period of time. Therefore, the control arrangement is further configured to measure the temperature of the surrounding environment, select the absolute value of the second voltage to be applied and duration of the period for applying the second voltage based on the measured temperature. This ensures, that the applied second voltage and duration of the period for applying the second voltage reduces response time of switching between the first optical state and the second optical state.

The control arrangement is operable to control the image projecting means to project a separate pair of images on each optical element in the second optical state, for displaying the three-dimensional image to each eye of the user. The control arrangement is operable to provide instructions to the image projecting means, to project the separate pair of images corresponding to the three-dimensional image on each optical element in the second optical state. For example, the three-dimensional image is associated with 10 pairs of images (such that each of the first set and the second set of images comprise 10 images) and the plurality of optical elements comprises 10 optical elements. In such an example, when a first optical element is in the second optical state, the control arrangement is operable to control the image projecting means to project a first pair of images on the first optical element. Subsequently, when the first optical element has been switched back to the first optical state and a second optical element is in the second optical state, the control arrangement is operable to control the image projecting means to project a second pair of images on the second optical element. Similarly, the control arrangement is operable to synchronize projection of the different pairs of images with the switching of each of the plurality of optical elements to the second optical state, such that each pair of images is displayed on the optical display arrangement at a high volumetric refresh rate (preferably, more than 50 Vps and optionally, at least 100 Vps). Such a display of the pairs of images at the high volumetric refresh rate enables the user of the near-eye display apparatus to experience increased depth-perception associated with the three-dimensional image (such as due to persistence of vision), while substantially overcoming problems associated with conventional presentation techniques of three-dimensional images (such as, accommodation-vergence conflict).

In one embodiment, the apparatus further comprises a data storage medium coupled to the control arrangement, wherein the data storage medium is operable to store the first set of images and the second set of images corresponding to the three-dimensional image. The term "data storage medium" as used herein, relates to a storage device for storing the images, videos, files and so forth (such as the first set of images and the second set of images) associated with the three-dimensional image. In such an instance, the data storage medium is operable to provide the stored images (or videos) to the control arrangement, wherein, optionally, the control arrangement is operable to perform image processing thereof before providing the images to the image projecting means for projection thereof. The data storage can be communicatively coupled to the control arrangement, or the data storage can be incorporated within the control module.

In an embodiment, the data storage medium is coupled to the control arrangement using at least one of a high-throughput wired communication network or a high-throughput wireless communication network. For example, the data storage medium can be coupled to the control arrangement using at least one of a high-throughput DisplayPort connection, a High-Definition Multimedia Interface (or HDMI) connection, a WirelessHD (or UltraGig) connection, a Wireless Gigabit Alliance (or WiGig) connection or any other connection operating at a extremely high frequency range (such as, more than 60 GHz). Such a coupling using the high-throughput wired or wireless communication network enables the data storage medium to transmit a large amount of data per second to the control arrangement, to enable the near-eye display apparatus to achieve the high volumetric refresh rate.

The apparatus comprises at least one optical device arranged between the at least one optical display arrangement and the eyes of the user, wherein the at least one optical device allows display of the three-dimensional image to each eye of the user. The at least one optical device can be implemented as eyepieces that are arranged within the near-eye display apparatus for each eye of the user, wherein the eyepieces enable proper magnification of the images displayed on the optical display arrangement. Such a magnification of the images enables improved depth perception associated with the displayed three-dimensional image for the user. In an example, the at least one optical device comprises a left eyepiece that is arranged in an optical path between the optical display arrangement and the left eye of the user and a right eyepiece that is arranged in an optical path between the optical display arrangement and the right eye of the user. The left eyepiece enables display of the first set of images for the left eye of the user while the right eyepiece enables display of the second set of images for the right eye of the user. In an example, the at least one optical device is implemented as at least one of optical lenses, Fresnel lenses, holographic optical elements, curved mirrors, freeform mirrors, prisms and so forth.

Optionally, the at least one optical device enables magnification of the images displayed on the optical display arrangement, such that the images are displayed at different apparent distances (or at image planes located at different distances). For example, the optical display arrangement comprises 10 optical elements arranged equidistant from each other. In such an example, the at least one optical device enables the pairs of images (corresponding to the first set and the second set of images) to be displayed at different distances corresponding to the different image planes. For example, pairs of images corresponding to a second optical element can be displayed at a first distance of the second optical element from a first optical element. Furthermore, pairs of images corresponding to a third optical element can be displayed at a second distance of the third optical element from the second optical element, wherein the second distance is more than the first distance. Similarly, pairs of images corresponding to successive optical elements can be displayed at increasing (or decreasing) distances of images planes with respect to a preceding image plane. It will be appreciated such displaying of the pairs of images at different distances, enables improved accommodation and convergence of the eyes of the user. The image planes near the user will be located closer together, thereby, enabling eyes of the user to comfortably shift focus, such as, by converging together and rapidly accommodating to perceive the pairs of images displayed thereon. Furthermore, the images planes that are far from the user will be located farther away from each other, thereby, enabling the eyes of the user to diverge and gradually accommodate to perceive the pairs of images displayed thereon. Therefore, the magnification of the images by the at least one optical device enables the user to better perceive the depth associated with the three-dimensional image, thereby, substantially overcoming problems of accommodation-vergence conflict associated with conventional techniques of presentation of three-dimensional images.

In one embodiment, the apparatus further comprises an at least one second optical device arranged between the image projecting means and the at least one optical display arrangement, wherein the at least one optical device is operable to allow projection of the pairs of images on the plurality of optical elements. Such an at least one second optical device enables proper magnification and focusing of the pairs of images projected by the image projecting means, thus, enabling proper projection thereof onto the optical display arrangement. In an example, the at least one second optical device is implemented as at least one of optical lenses, Fresnel lenses, holographic optical elements, curved mirrors, freeform mirrors, prisms and so forth.

In an embodiment, the three-dimensional image is associated with at least one of a virtual-reality environment, or an augmented-reality environment. For example, the near-eye display apparatus is implemented as a virtual-reality headset, wherein the virtual-reality headset is operable to present the virtual-reality environment to a user thereof. In such an example, the three-dimensional image is associated with one or more computer-generated objects that form the virtual environment. Alternatively, the near-eye display apparatus is implemented as an augmented-reality headset, wherein the augmented-reality headset is operable to present the augmented-reality environment to a user thereof. In such an example, the three-dimensional image is associated with one or more computer-generated objects that are presented as part of a real-world environment, wherein the one or more computer-generated objects and the real-world environment form the augmented-reality environment.

In one embodiment, the at least one optical device is implemented as an optical combiner, wherein the optical combiner is operable to combine a view of a real-world environment with a view of a computer-generated image, to display the augmented-reality environment to the eyes of the user. The term "optical combiner" as used herein, relates to an optical device that combines (such as, by superimposition) the pairs of images associated with the three-dimensional image that is projected by the image projecting means, with ambient light rays associated with a real-world environment that are incident on the eyes of the user. Such a combination enables displaying to the eyes of the user, the three-dimensional image as part of the real-world environment of the user. Optionally, the optical combiner is implemented as at least one of a partially-transparent mirror, a prism, a waveguide, a holographic optical element, a lens, a switchable glass. For example, the optical combiner can comprise a switchable glass, such as, a photochromic glass or electrochromic materials. In such an example, when ambient light incident from the real-world environment is associated with high intensity (such as, when the real-world environment corresponds to a bright outdoor environment) the optical combiner is operable to control the intensity of the incident ambient light (by darkening thereof), thereby, providing an improved viewing experience for the user.

In one embodiment, the apparatus further comprises an image capturing device operatively coupled to the control arrangement, wherein the view of the real-world environment is generated using the image capturing device. For example, the image capturing device is implemented as a high-resolution camera, a video recorder, a depth data capture, a three-dimensional camera (i.e. two cameras arranged in distance from each others to form a three-dimensional image) and so forth. The image capturing device can be mounted on the near-eye display apparatus and can be communicatively coupled to the control arrangement. Furthermore, the image capturing device is operable to capture one or more images (or videos) of the real-world environment of the user. Subsequently, such captured one or more images (or videos) of the real-world environment are provided to the control arrangement. In such an instance, the control arrangement is operable to combine, in real-time, the one or more images (or videos) of the real-world environment with the pairs of images associated with the three-dimensional image, to display the augmented-reality environment to the user.

Based on further embodiment the apparatus is configured to adjust parallax value for the each of the formed pairs of images based on convergence angles, wherein the convergence angles are associated with respective optical plane of accommodation. The optical plane of accommodation is a respective optical element which is in the second optical state (opaque). As an example consider a three-dimensional image which is a landscape comprising a first object near to user and a second object far from the user. A first image pair associated with the first object has different parallax value than a second image pair associated with the second object. This way convergence angle which is associated with each of the plane of accommodation (a plane where the image pair is projected) can be taken in consideration when rendering the three dimensional image. I.e. optical plane of accommodation corresponds in practice to a respective plane where the image pair is projected.

The present description also relates to the method as described above. The various embodiments and variants disclosed above apply mutatis mutandis to the method.

The method of displaying a three-dimensional image using a near-eye display apparatus, the near-eye display apparatus comprising a plurality of optical elements, wherein each of the plurality of optical elements is operable to be switched between a first optical state and a second optical state, the active substance in each of the plurality of optical elements comprise a polymer free cholesteric liquid crystal, wherein the method comprises projecting a first set of images and a second set of images corresponding to the three-dimensional image, wherein corresponding images of the first set of images and the second set of images form pairs of images associated with different cross-sectional planes of the three-dimensional image; switching, separately, each optical element of the plurality of optical elements from the first optical state to the second optical state; and displaying the three-dimensional image to each eye of a user by providing a separate pair of images on each optical element in the second optical state.

Optionally, the method further comprises applying the voltage to switch each optical element from the second optical state to the first optical state; and removing the applied voltage to switch the optical element from the first optical state to the second optical state.

Optionally, the plurality of optical elements is switched between the first optical state and the second optical state in a sequential manner, or an interlaced manner.

Optionally, the method further comprises storing the first set of images and the second set of images corresponding to the three-dimensional image.

Optionally, the three-dimensional image is associated with at least one of a virtual-reality environment, or an augmented-reality environment.

Optionally, the method further comprises capturing a view of a real-world environment to generate the augmented-reality environment.

Optionally or alternatively the method further comprises adjusting parallax value for the each of the formed pairs of images based on convergence angles, wherein the convergence angles are associated with respective optical plane of accommodation. The optical plane of accommodation is a respective optical element which is in the second optical state (opaque). As an example consider a three-dimensional image which is a landscape comprising a first object near to user and a second object far from the user. A first image pair associated with the first object has different parallax value than a second image pair associated with the second object. This way convergence angle which is associated with each of the plane of accommodation (a plane where the image pair is projected or appears to be projected) can be taken in consideration when rendering the three dimensional image. Thus, in this example division of full range of convergence angles into subsets which are associated with particular planes of accommodation (optical diffuser elements) when these are considered for generation of respective image pairs (for recreation of 3D image or scene), substantially alleviates adverse effects related to accommodation-convergence conflict. In some embodiment it might be sufficient to adjust parallax of formed image pairs for sub set of the formed image pairs such as for one, two, three, four or five pairs or more pairs.

DETAILED DESCRIPTION OF THE DRAWINGS

Figure 1A:
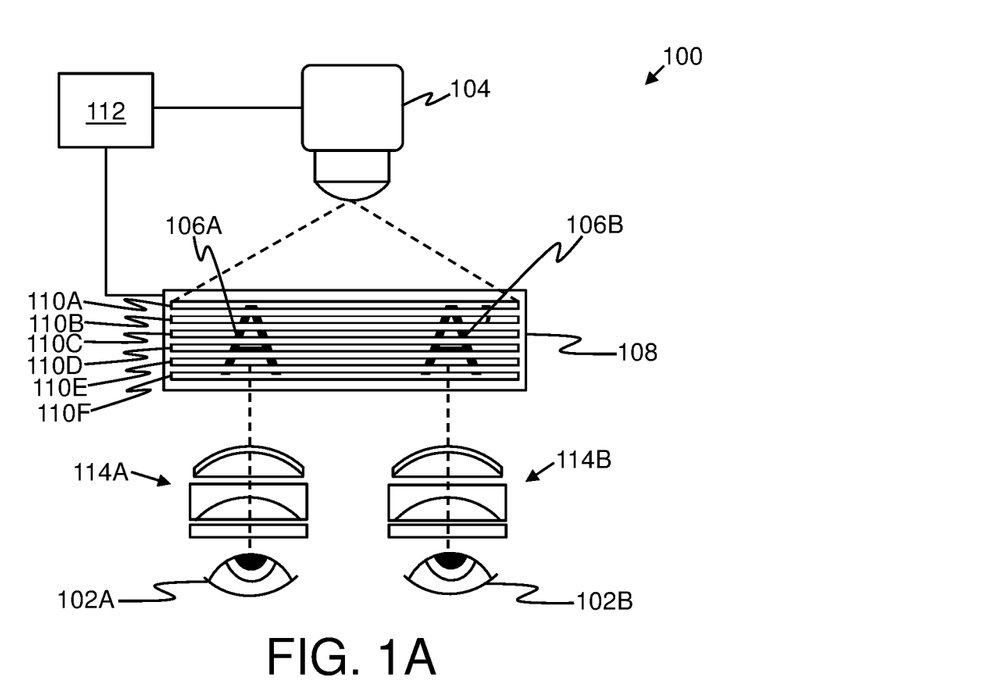
FIGS. 1A-D are schematic illustrations of a near-eye display apparatus for displaying a three-dimensional image to eyes of a user, in accordance with various embodiments of the present disclosure.

Referring to FIG. 1A, there is shown a schematic illustration of a near-eye display apparatus 100 for displaying a three-dimensional image to eyes 102A-B of a user, in accordance with an embodiment of the present disclosure. The near-eye display apparatus 100 comprises an image projecting means 104 to project a first set of images 106A and a second set of images 106B corresponding to the three-dimensional image (not shown). Furthermore, the near-eye display apparatus 100 comprises at least one optical display arrangement 108 comprising a plurality of optical elements 110A-F. Moreover, the near-eye display apparatus 100 comprises a control arrangement 112 operatively coupled to each of the image projecting means 104 and the at least one optical display arrangement 108. As shown, the near-eye display apparatus 100 comprises at least one optical device 114A-B arranged between the at least one optical display arrangement 108 and the eyes 102A-B of the user.

Figure 1B:
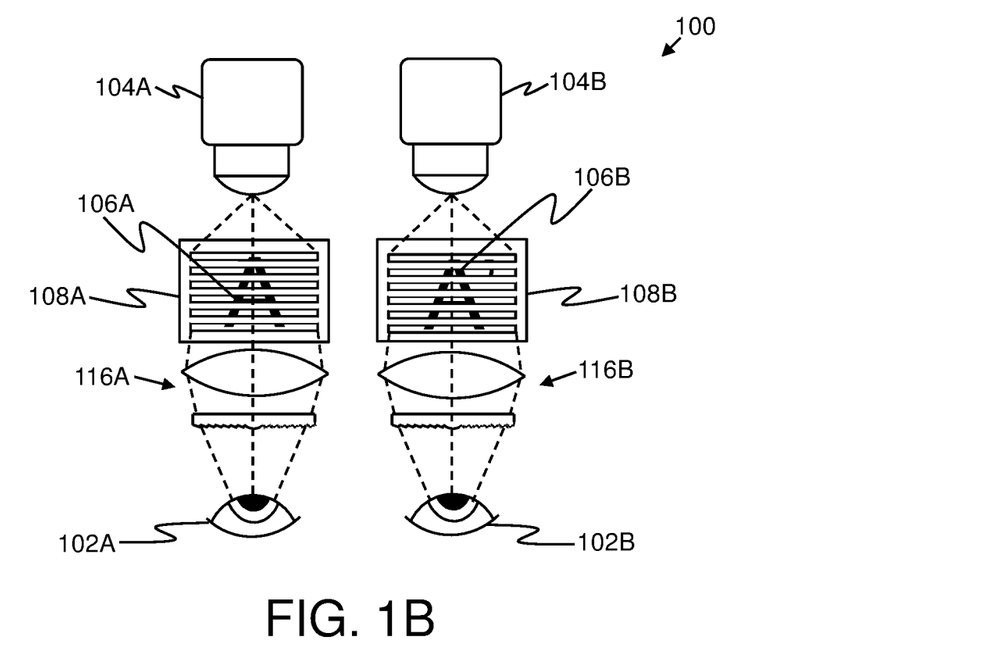

Referring to FIG. 1B, there is shown a schematic illustration of the near-eye display apparatus 100 of FIG. 1A, in accordance with another embodiment of the present disclosure. As shown, the image projecting means 104 is implemented using a first image projecting means 104A that projects the first set of images 106A and a second image projecting means 104B that projects the second set of images 106B corresponding to the three-dimensional image. Furthermore, the optical display arrangement 108 is implemented using a first optical display arrangement 108A that displays the first set of images 106A thereon, and a second optical display arrangement 108B that displays the second set of images 106A thereon. Moreover, the near-eye display apparatus 100 comprises at least one optical device 116A-B arranged between each of the at least one optical display arrangement 108A-B and the eyes 102A-B of the user respectively.

Figure 1C:
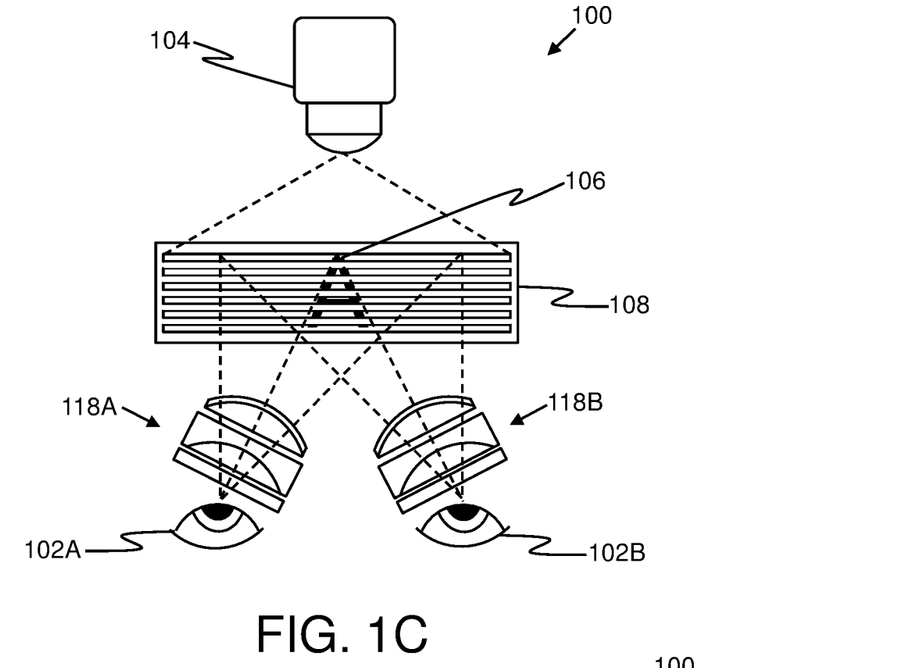

Referring to FIG. 10, there is shown a schematic illustration of the near-eye display apparatus 100 of FIG. 1A, in accordance with yet another embodiment of the present disclosure. As shown, the image projecting means 104 projects a single set of images 106 corresponding to the three-dimensional image (not shown). The near-eye display apparatus 100 comprises optical devices 118A-B arranged between the at least one optical display arrangement 108 and the eyes 102A-B of the user. As shown, the optical devices 118A-B are slightly rotated with respect to an optical path between the optical display arrangement 108 and the eyes 102A-B of the user, to provide each eye 102A-B of the user with a slightly different visual perspective of the three-dimensional image.

Figure 1D:
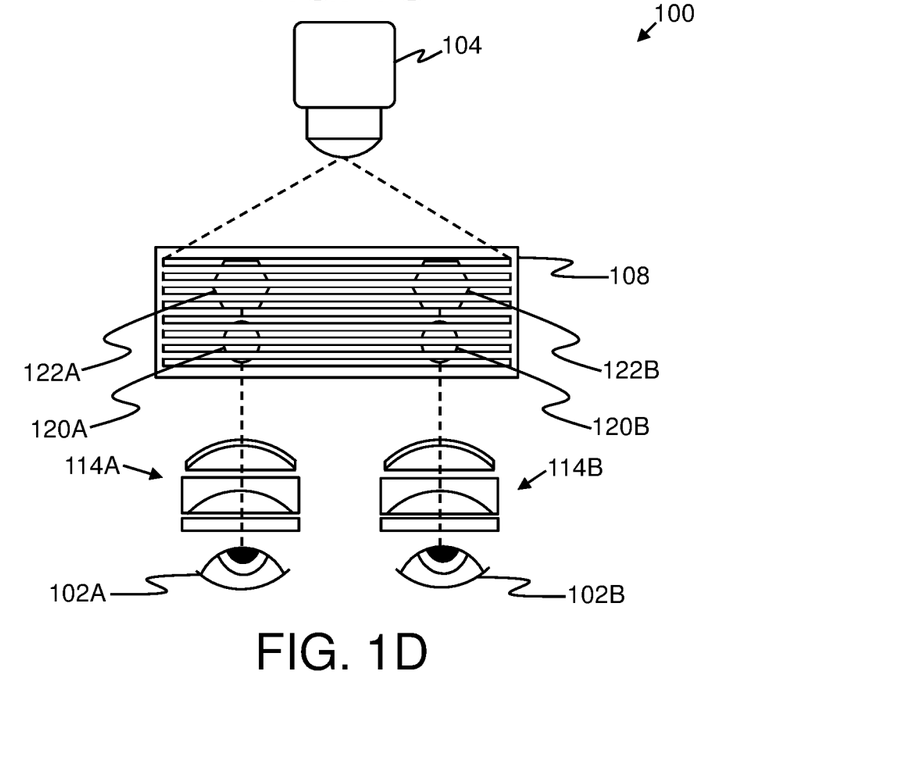

Referring to FIG. 1D, there is shown a schematic illustration of the near-eye display apparatus 100 of FIG. 1A, in accordance with yet another embodiment of the present disclosure. As shown, the image projecting means 104 projects a first set of images and a second set of images onto the at least one optical display arrangement 108, wherein the first and the second set of images correspond to a first three-dimensional image 120A-B and a second three-dimensional image 122A-B. Furthermore, the first three-dimensional image 120A-B and the second three-dimensional image 122A-B are projected at a physical separation from each other on the plurality of optical elements of the optical display arrangement 108. Such a projection enables the eyes 102A-B of the user to perceive depth associated with the displayed three-dimensional images, due to parallax associated with the physical separation between first three-dimensional image 120A-B and the second three-dimensional image 122A-B.

Figure 2A:
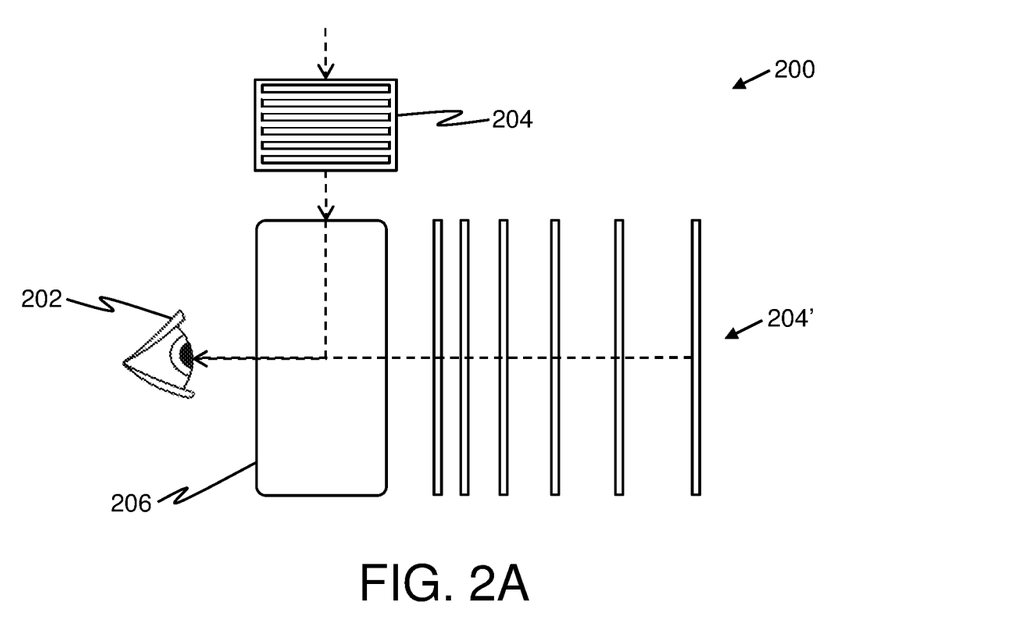
FIG. 2A is a schematic illustration of a near-eye display apparatus for displaying a three-dimensional image to eyes of a user, in accordance with an embodiment of the present disclosure.

Referring to FIG. 2A, there is shown a schematic illustration of a near-eye display apparatus 200 for displaying a three-dimensional image (not shown) to eyes 202 of a user, in accordance with an embodiment of the present disclosure. As shown, an optical display arrangement 204 is arranged above an optical path between the eyes 202 of the user and an at least one optical device 206. Furthermore, pairs of images corresponding to the three-dimensional image are projected onto the optical display arrangement 204. The projected three-dimensional image is displayed to the eyes 202 of the user, wherein the user perceives the three-dimensional image to be located at apparent position 204' of the optical display arrangement 204.

Figure 2B:
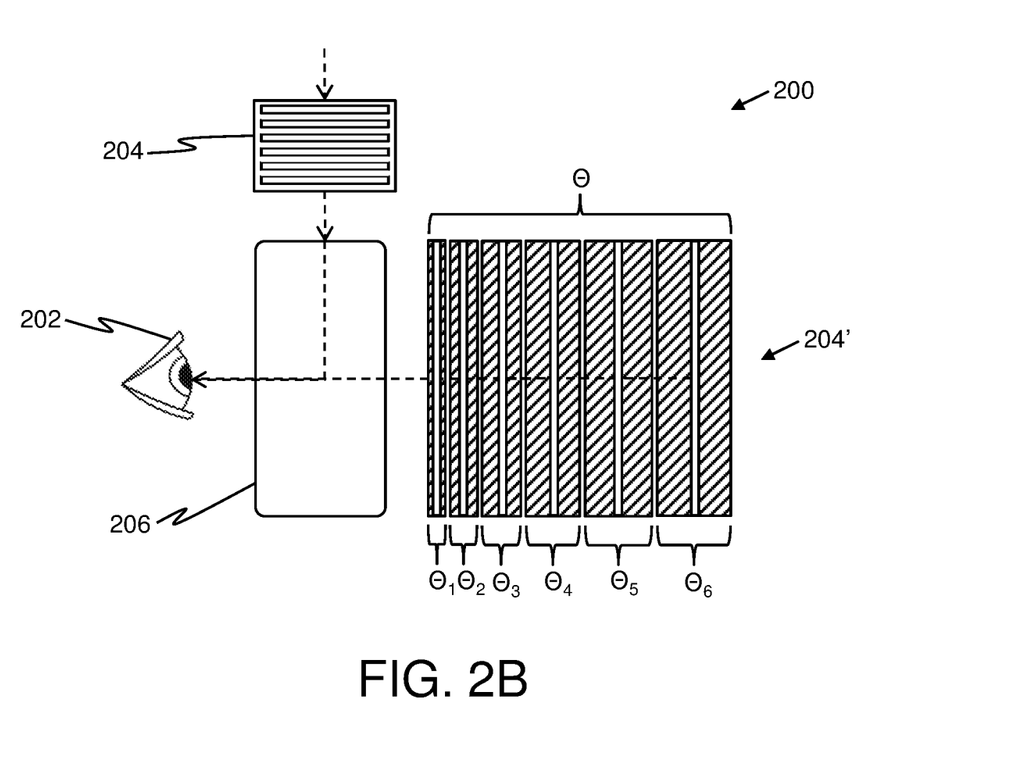
FIG. 2B is a schematic illustration of an exemplary usage of the near-eye display apparatus of FIG. 2A, in accordance with an embodiment of the present disclosure.

Referring to FIG. 2B, there is shown a schematic illustration of an exemplary user scenario of the near-eye display apparatus 200 of FIG. 2A, in accordance with an embodiment of the present disclosure. The pairs of images corresponding to the three-dimensional image are projected on the optical display arrangement 204 such that the user perceives the three-dimensional image to be located at apparent position 204' of the optical display arrangement 204. Furthermore, the eyes 202 of the user can perceive the three-dimensional image over a convergence angle θ of the eyes 202 of the user. As shown, the convergence angle Θ is subdivided into convergence angles $θ_1$-$θ_6$, wherein each optical element of the optical display arrangement 204 displays a portion of the three-dimensional image corresponding to an image depth plane (shown as a shaded region around each optical element) associated with the convergence angles $θ_1$-$θ_6$. In such an instance, the at least one optical device 206 enables the pair of images displayed on each optical element to be extrapolated in a separation gap between the optical elements, such that the eyes 202 of the user perceive depth associated with the three-dimensional image over the convergence angle θ. In this example parallax values (i.e. pairs of images are at distance from each other in respect to eyes to form apparent 3d image experience for the user) are different for different pairs of images depending on the depth value and convergence angles.

Figure 3:
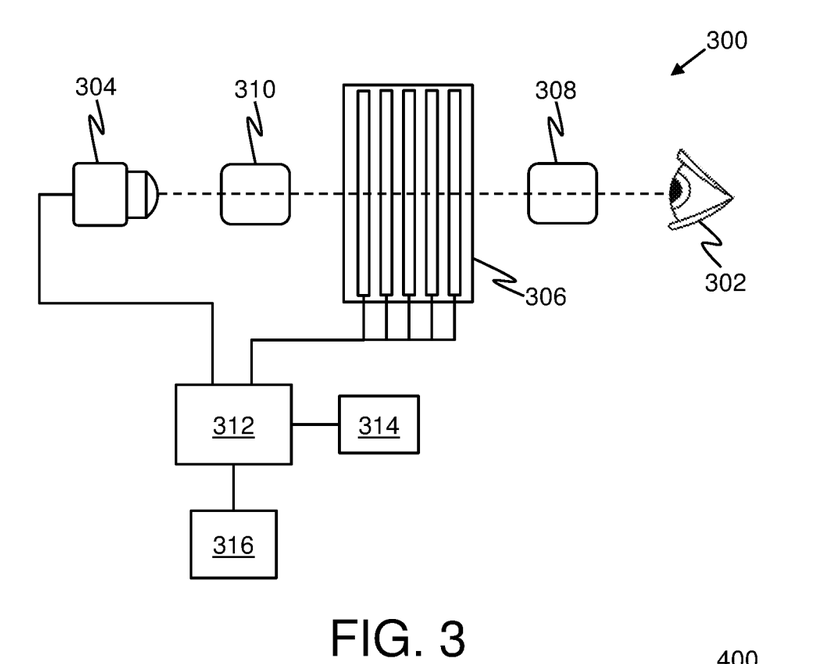
FIG. 3 is a schematic illustration of a near-eye display apparatus (such as the near-eye display apparatus of FIG. 1A) implemented in a virtual-reality headset, in accordance with an embodiment of the present disclosure.

Referring to FIG. 3, there is shown a schematic illustration of a near-eye display apparatus 300 (such as the near-eye display apparatus 100 of FIG. 1A) implemented in a virtual-reality headset (not shown), in accordance with an embodiment of the present disclosure. The near-eye display apparatus 300 comprises an image projecting means 304 for projecting pairs of images associated with different cross-sectional planes of a three-dimensional image (such as a computer-generated object). Furthermore, the near-eye display apparatus 300 comprises at least one optical display arrangement 306 comprising a plurality of optical elements for displaying the projected pairs of images. Moreover, the near-eye display apparatus 300 comprises an at least one optical device 308 arranged between the optical display arrangement 306 and eyes 302 of a user, and at least one second optical device 310 arranged between the image projecting means 304 and the at least one optical display arrangement 306. As shown, the near-eye display apparatus 300 comprises a control arrangement 312 operatively coupled to each of the image projecting means 304 and the at least one optical display arrangement 306. The control arrangement 312 is further coupled to a voltage source 314 and a data storage medium 316.

Figure 4A:
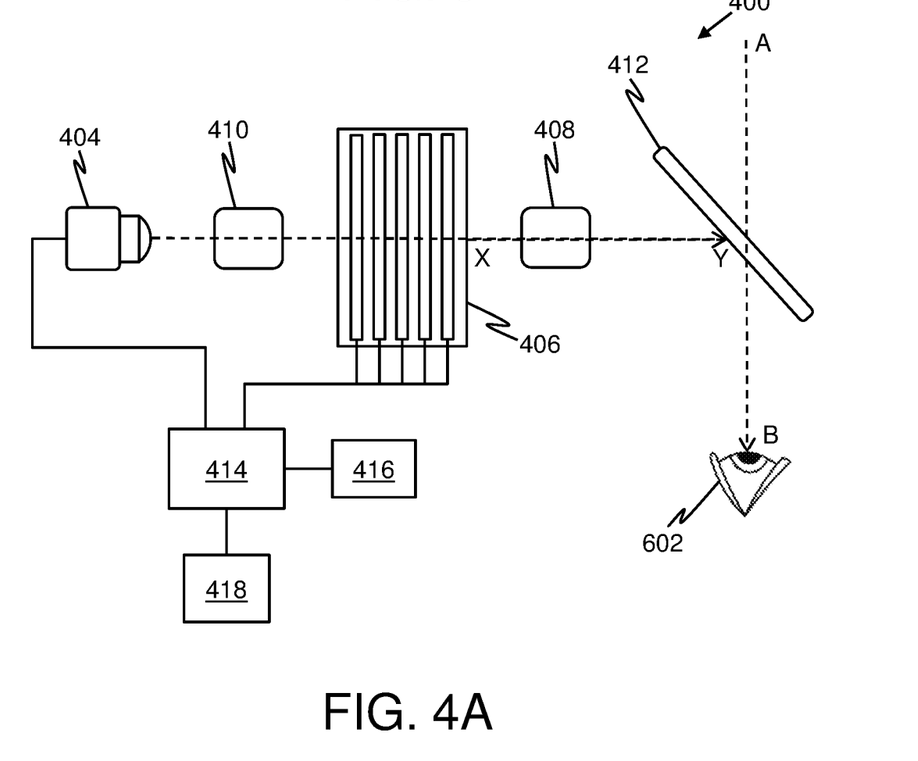
FIGS. 4A-B are schematic illustrations of a near-eye display apparatus (such as the near-eye display apparatus of FIG. 1A) implemented in an augmented-reality headset, in accordance with different embodiments of the present disclosure.

Referring to FIG. 4A, there is shown a schematic illustration of a near-eye display apparatus 400 (such as the near-eye display apparatus 100 of FIG. 1A) implemented in an augmented-reality headset (not shown), in accordance with an embodiment of the present disclosure. The near-eye display apparatus 400 comprises an image projecting means 404 for projecting pairs of images associated with different cross-sectional planes of a three-dimensional image (such as a computer-generated object). Furthermore, the near-eye display apparatus 400 comprises at least one optical display arrangement 406 comprising a plurality of optical elements for displaying the projected pairs of images. Moreover, the near-eye display apparatus 400 comprises an at least one optical device 408 arranged between the optical display arrangement 406 and eyes 402 of a user, and at least one second optical device 410 arranged between the image projecting means 404 and the at least one optical display arrangement 406. As shown, the near-eye display apparatus 400 further comprises an optical combiner 412, wherein the optical combiner is operable to combine a view of a real-world environment (associated with ambient light A-B) with a view of three-dimensional image (associated with light X-Y). Furthermore, the near-eye display apparatus 400 comprises a control arrangement 414 operatively coupled to each of the image projecting means 404 and the at least one optical display arrangement 406. The control arrangement 414 is further coupled to a voltage source 416 and a data storage medium 418.

Figure 4B:
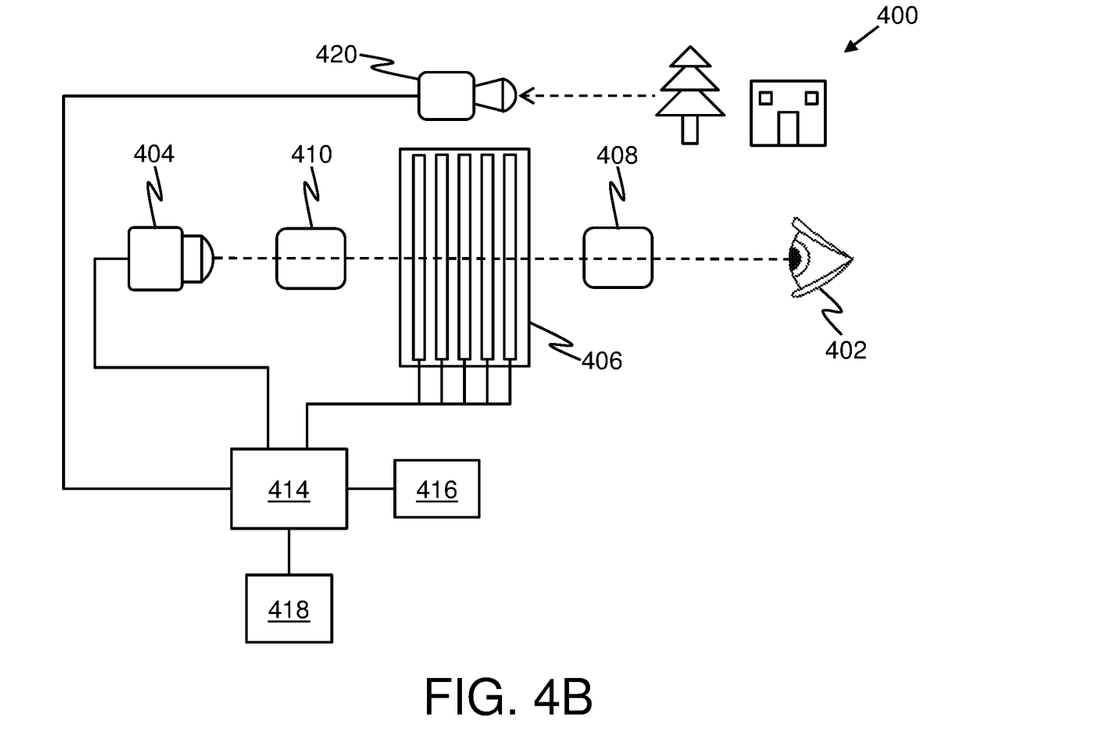

Referring to FIG. 4B, there is shown a schematic illustration of the near-eye display apparatus 400 of FIG. 4A implemented in an augmented-reality headset (not shown), in accordance with another embodiment of the present disclosure. As shown, the near-eye display apparatus 400 does not comprise the optical combiner 412 (shown in FIG. 4A). The near-eye display apparatus 400 further comprises an image capturing device 420 operatively coupled to the control arrangement 414, wherein the view of the real-world environment is generated using the image capturing device 420.

Figure 5:
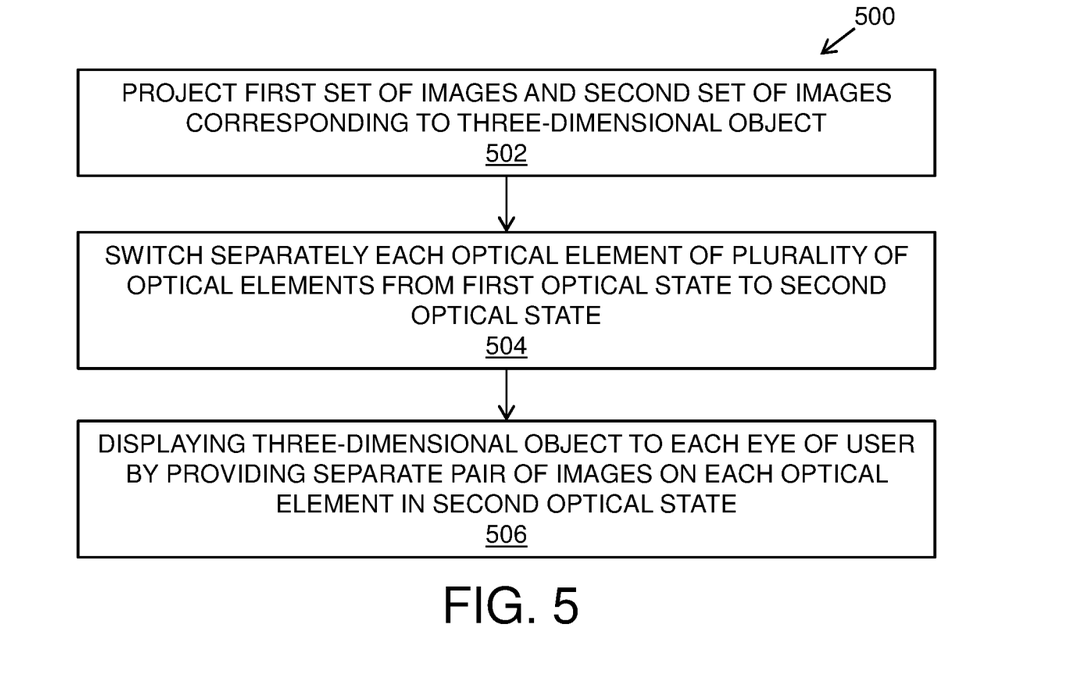
FIG. 5 is an illustration of steps of a method of displaying a three-dimensional image using a near-eye display apparatus, in accordance with an embodiment of the present disclosure.

Referring to FIG. 5, there are shown steps of a method 500 of displaying a three-dimensional image using a near-eye display apparatus, in accordance with an embodiment of the present disclosure. At a step 502, a first set of images and a second set of images corresponding to the three-dimensional image are projected, wherein corresponding images of the first set of images and the second set of images form pairs of images associated with different cross-sectional planes of the three-dimensional image. At step 504, each optical element of the plurality of optical elements is switched separately from the first optical state to the second optical state. At step 506, the three-dimensional image is displayed to each eye of a user by providing a separate pair of images on each optical element in the second optical state.

The steps 502 to 506 are only illustrative and other alternatives can also be provided where one or more steps are added, removed or provided in a different sequence without departing from the scope of the claims herein. In an example, the method 500 further comprises steps of applying a voltage to switch each optical element from the second optical state to the first optical state; and removing the applied voltage to switch the optical element from the first optical state to the second optical state. In another example, the first optical state is an optically transparent state and the second optical state is an optically opaque state. In yet another example, the plurality of optical elements is switched between the first optical state and the second optical state in a sequential manner, or an interlaced manner.

In one example, the method 500 further comprises a step of storing the first set of images and the second set of images corresponding to the three-dimensional image. In another example, the three-dimensional image is associated with at least one of a virtual-reality environment, or an augmented-reality environment. In yet another example, the method 500 further comprises a step of capturing a view of a real-world environment to generate the augmented-reality environment.

Figure 6:
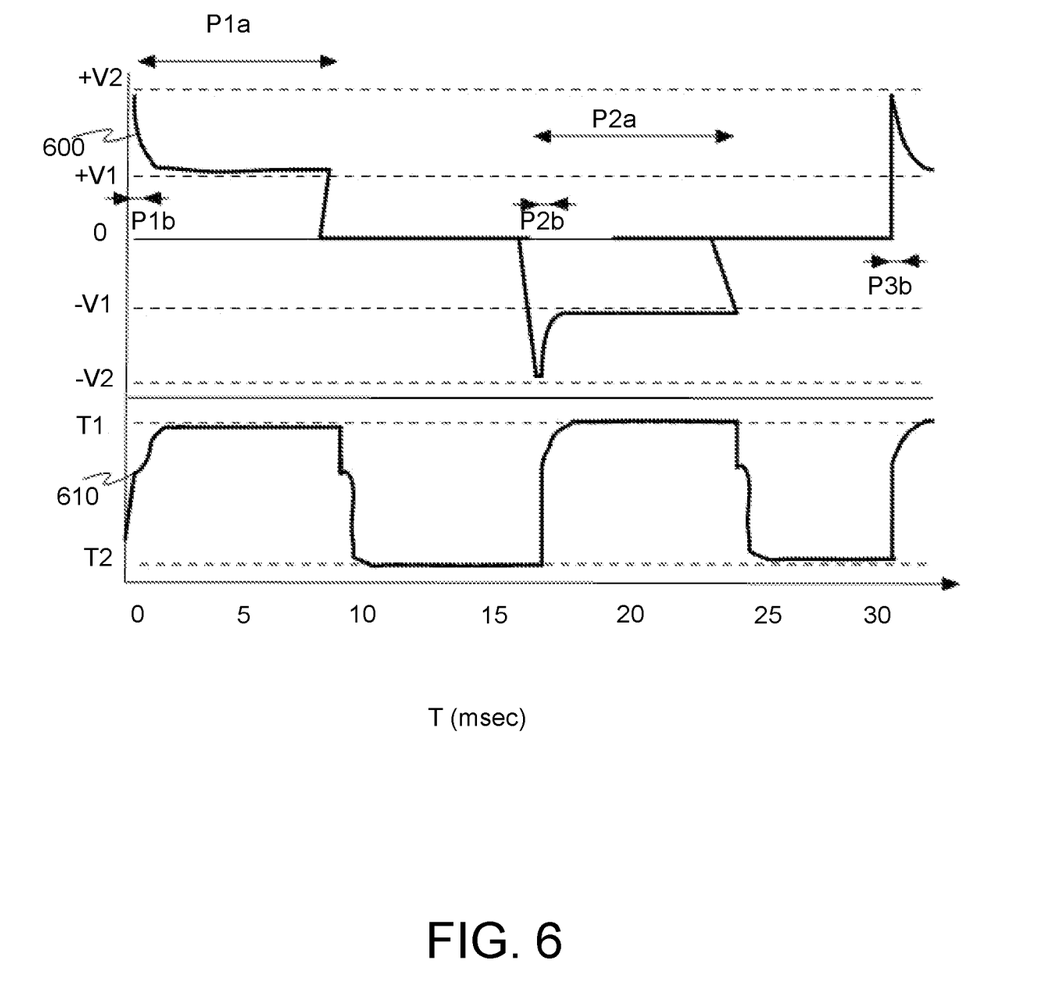
FIG. 6 is a is a graph illustrating a timing diagram of a change in voltage applied and light transmission with respect to time during switching of an optical element between a first optical state and a second optical state, in accordance with an embodiment of the present disclosure.

Referring to FIG. 6, there is shown an illustration of a timing diagram according to an embodiment. The diagram illustrates impact of applied control voltage 600 to light transmission 610 as a function of time. At time 0 msec the control voltage is applied to a first optical element for a first period of time P1a. The control voltage comprises a first voltage of +V1 and a second voltage +V2. The second voltage +V2 has an absolute value of which is higher than the first voltage +V1 as indicated in the figure. In given example, the second voltage is about 2× higher than the first voltage. The second voltage is applied before the first voltage for a period of time for applying the second voltage of P1b. The period of time P1b is in range below one millisecond such as 600 microseconds. The entire period P1a can be for example 8 milliseconds. The first optical element is thus transferred from a second optical state to a first optical state. In the second optical state the transmission of light thru the element is T2 and in the first optical state, the transmission of light thru the element is T1. Typical ranges of transmission of light T1 are of 89%-96%, with most typical values between 92%-95%. In the second optical state T2 the light transmission corresponds to T2 which corresponds to 0.1%-2% direct light transmission—with the major part of incident light being scattered or diffused to form an image.

Furthermore, the second voltage (applied at periods of time of P1b, P2b and P3b) of the control voltage has typically a peak with a plateau region at +/−V2 for a duration of time of the period (for example <100 microseconds or <200 microseconds). The second voltage is a high voltage peak which can be dangerous for the integrity of the liquid crystal cell and its operation can facilitate electric breakdown—thus the duration of peak is short and substantially immediately followed by exponential relaxation of the control voltage to the first voltage. Typical relaxation time for the voltage to change from +/−V2 to +/V1 correspondingly is in order of milliseconds (for example 0.5 ms, 0.8 ms, 1 ms, 1.2 ms, 1.5 ms, 2 ms, 3 ms etc.).

Control voltage driving is carried out in periodical manner by applying first a positive control voltage for a period of time Pia and then negative control voltage for period P2a. Between the periods, the applied control voltage is removed. The absolute value of the second voltage (peak) has absolute value higher than the absolute value of the first voltage i.e. for example if the first voltage is −100V then the second voltage is −150V i.e −abs(−100V)×1.5=−150V. Similarly, +100V×1.5=+150 V.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A near-eye display apparatus for displaying a three-dimensional image to eyes of a user, wherein the apparatus comprises:
   an image projecting means to project a first set of images and a second set of images corresponding to the three-dimensional image, wherein corresponding images of the first set of images and the second set of images form pairs of images associated with different cross-sectional planes of the three-dimensional image;
   at least one optical display arrangement comprising a plurality of optical elements, wherein each of the plurality of optical elements is operable to be switched between a first optical state and a second optical state, the active substance in each of the plurality of optical elements comprise a polymer free cholesteric liquid crystal;
   a control arrangement operatively coupled to each of the image projecting means and the at least one optical display arrangement, wherein the control arrangement is operable to control:
      the at least one optical display arrangement to separately switch each optical element of the plurality of optical elements from the first optical state to the second optical state; and
      the image projecting means to project a separate pair of images on each optical element in the second optical state, for displaying the three-dimensional image to each eye of the user;
   and
   at least one optical device arranged between the at least one optical display arrangement and the eyes of the user, wherein the at least one optical device allows display of the three-dimensional image to each eye of the user.

2. A near-eye display apparatus according to claim 1, wherein a time period of switching between the first optical state and the second optical state is less than or equal to 600 microseconds.

3. A near-eye display apparatus according to claim 1, further comprising a voltage source operatively coupled to each of the at least one optical display arrangement and the control arrangement, wherein the control arrangement is further operable to control the voltage source to:
   apply a control voltage for a first period of time to the at least one optical display arrangement to switch each optical element from the second optical state to the first optical state; or
   remove the applied control voltage to switch the optical element from the first optical state to the second optical state.

4. A near-eye display apparatus according to claim 3, wherein the control voltage comprises a first voltage and a second voltage, wherein an absolute value of the second voltage is from 20% up to 65% higher than an absolute value of the first voltage and wherein the second voltage is applied before the first voltage.

5. A near-eye display apparatus according to claim 4, wherein the control arrangement is further operable to control the voltage source to:
   select the absolute value of the second voltage and duration of a period for applying the second voltage based on a surrounding environment temperature.

6. A near-eye display apparatus according to claim 1, wherein the first optical state is an optically transparent state and the second optical state is an optically opaque state.

7. A near-eye display apparatus according to claim 1, further comprising a data storage medium coupled to the control arrangement, wherein the data storage medium is operable to store the first set of images and the second set of images corresponding to the three-dimensional image.

8. A near-eye display apparatus according to claim 7, wherein the data storage medium is coupled to the control arrangement using at least one of a high-throughput wired communication network or a high-throughput wireless communication network.

9. A near-eye display apparatus according to claim 1, wherein the three-dimensional image is associated with at least one of a virtual-reality environment or an augmented-reality environment.

10. A near-eye display apparatus according to claim 9, wherein the at least one optical device is implemented as an optical combiner, and the optical combiner is operable to combine a view of a real-world environment with a view of a computer-generated image, to display the augmented-reality environment to the eyes of the user.

11. A near-eye display apparatus according to claim 9, further comprising an image capturing device operatively coupled to the control arrangement, wherein the view of the real-world environment is generated using the image capturing device.

12. A near-eye display apparatus according to claim 1, further comprising at least one second optical device arranged between the image projecting means and the at least one optical display arrangement, wherein the at least one second optical device is operable to allow projection of the pairs of images on the plurality of optical elements.

13. A method of displaying a three-dimensional image using a near-eye display apparatus, the near-eye display apparatus comprising a plurality of optical elements, wherein each of the plurality of optical elements is operable to be switched between a first optical state and a second optical state, the active substance in each of the plurality of optical elements comprise a polymer free cholesteric liquid crystal, wherein the method comprises:

projecting a first set of images and a second set of images corresponding to the three-dimensional image, wherein corresponding images of the first set of images and the second set of images form pairs of images associated with different cross-sectional planes of the three-dimensional image;

switching, separately, each optical element of the plurality of optical elements from the first optical state to the second optical state; and displaying the three-dimensional image to each eye of a user by providing a separate pair of images on each optical element in the second optical state.

14. A method according to claim 13, wherein a time period of switching between the first optical state and the second optical state is less than or equal to 600 microseconds.

15. A method according to claim 14, further comprising:
applying a control voltage for a first period of time to switch each optical element from the second optical state to the first optical state; and
removing the applied control voltage to switch the optical element from the first optical state to the second optical state.

16. A method according to claim 15, wherein the control voltage comprises a first voltage and a second voltage, wherein an absolute value of the second voltage is from 20% up to 65% higher than an absolute value of the first voltage and wherein the second voltage is applied before the first voltage.

17. A method according to claim 16, further comprising;
selecting the absolute value of the second voltage and duration of a period for applying the second voltage based on a surrounding environment temperature.

18. A method according to claim 13, wherein the first optical state is an optically transparent state and the second optical state is an optically opaque state.

19. A method according to claim 13, wherein the plurality of optical elements is switched between the first optical state and the second optical state in a sequential manner, or an interlaced manner.

20. A method according to claim 13, wherein the method comprises adjusting parallax value for the each of the formed pairs of images based on convergence angles, wherein the convergence angles are associated with respective optical plane of accommodation.

* * * * *